UNITED STATES PATENT OFFICE.

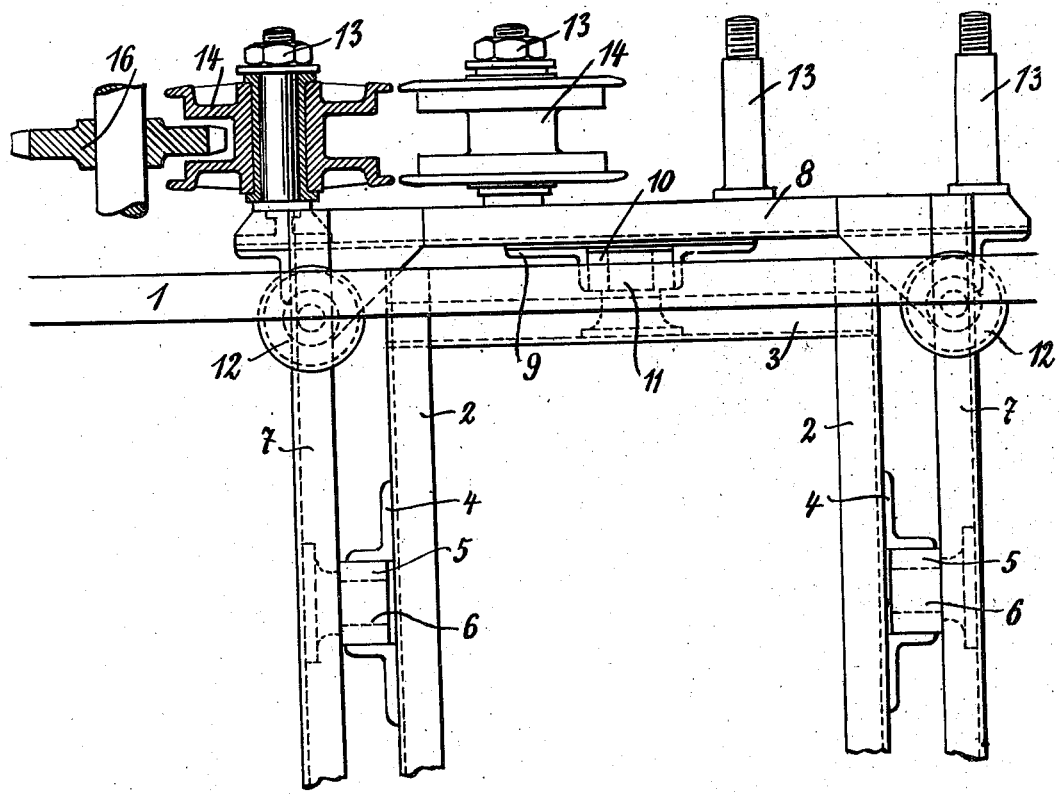

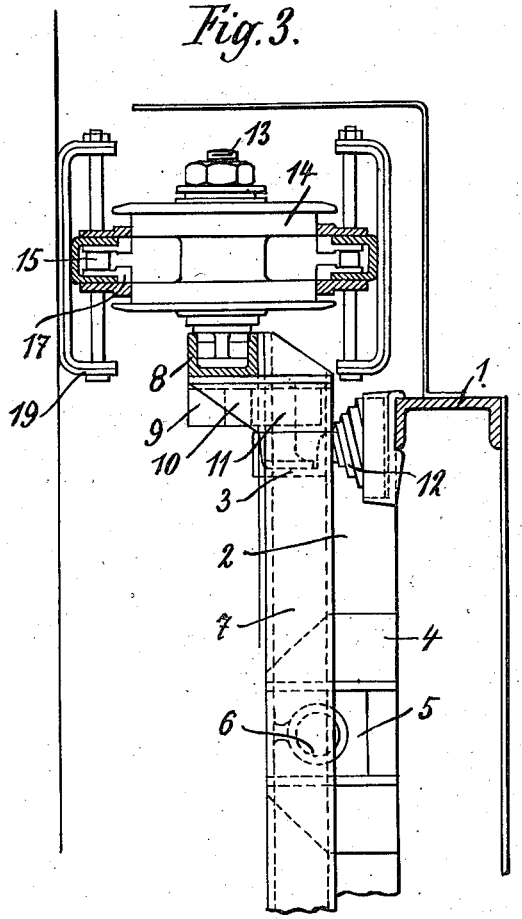

JULES GOBIET, OF VALENTIGNEY, FRANCE.

MOTOR-VEHICLE.

1,216,681.   Specification of Letters Patent.   Patented Feb. 20, 1917.

Application filed May 17, 1915. Serial No. 28,608.

*To all whom it may concern:*

Be it known that I, JULES GOBIET, a citizen of the French Republic, and residing at Valentigney, Doubs, France, have invented certain new and useful Motor-Vehicles and the like, of which the following is a specification.

The arrangement forming the subject matter of the present invention is intended to allow the suspension of a motor vehicle the propulsion of which is obtained by means of an endless metal chain resting on the ground, this chain being of special construction and movement being imparted to it by a sprocket wheel, the shaft of which forms part of the suspended portion of the machine.

One form of carrying the invention into effect is shown by way of example in the accompanying drawings, in which:

Fig. 2 is a partial plan view of the suspension and driving means, and

Fig. 3 is a front view of the means represented in Fig. 2.

Figure 1:
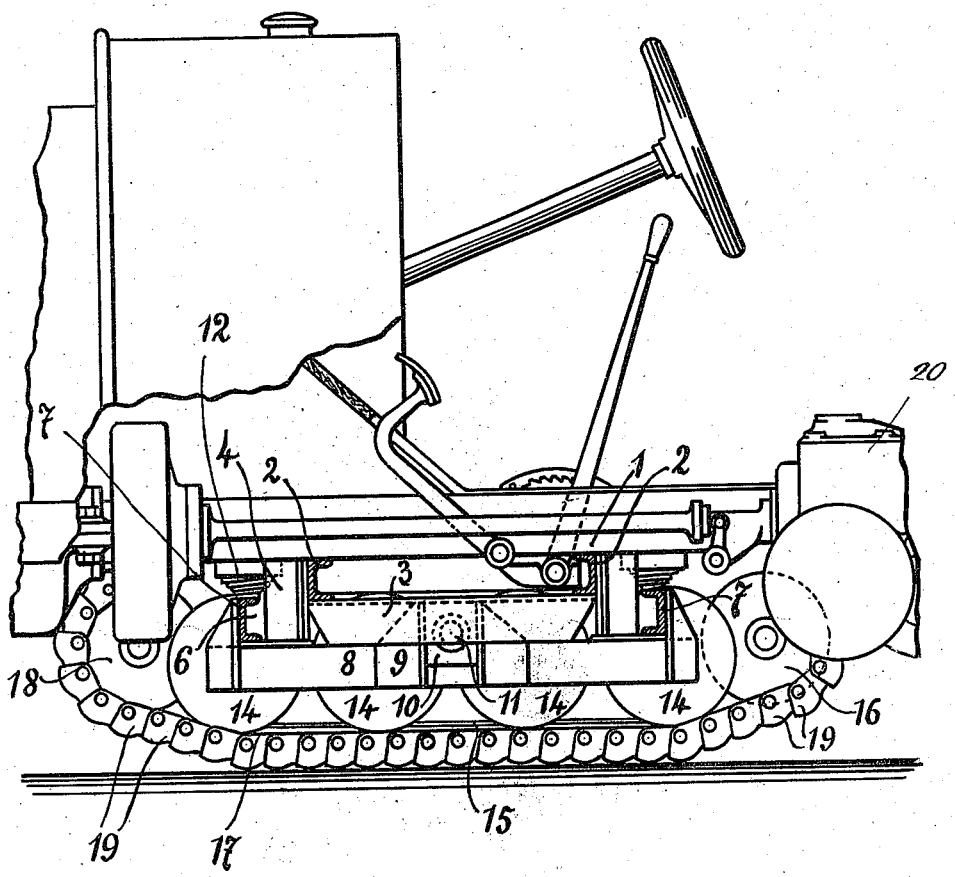
Figure 1 is a view in elevation of a machine provided with the new arrangement, the part of the machine lying in front of the said arrangement having been taken away to show the details of assembling.

1 is one of the longitudinal members of a principal chassis carrying the motor and the various transmission and driving parts, as in an ordinary motor driven vehicle.

The longitudinal members 1 are transversely connected by two cross members 2 which in their turn carry two small longitudinal members 3 perpendicular to these cross members, and disposed parallel and below the principal longitudinal members.

On the cross members 2 there are fixed two guides 4 which consist of angle irons. These angle irons receive between them a block 5 which can undergo displacement as in a guide path. Each of the two blocks 5 is pierced with a hole in which engages a pivot 6 fixedly mounted on a cross member 7 belonging to a secondary chassis formed by two cross members 7 and two longitudinal members 8.

The two longitudinal members 8 carry two guides 9 similar to the guides 4, each of which receives a sliding block 10 forming a slide as in the method of mounting described for the blocks 5. The two blocks 10 are pierced with a hole in which engages a pivot 11, fixed to the small longitudinal member 3 of the principal chassis.

It will be understood that the whole of this assembling arrangement behaves in the manner of a Cardan joint, when the principal chassis is carried by the secondary chassis by the agency of springs 12 spiral or of other suitable form. Blocks 5 and 10 are the jointing points of this large Cardan joint; they allow of the free play of the springs 12, but they oppose all longitudinal or transverse displacement of the principal chassis relatively to the secondary chassis. The whole, therefore, constitutes an elastic suspension and a thrust arrangement of the principal chassis carrying the driving parts.

The longitudinal member 8 carries journals 13 on which are mounted carrier rollers 14 which run on the chain 15 and support the upper side of the latter.

The chain 15 is driven by a sprocket 16 revolving on a shaft fixed to the principal chassis.

It results from this that the rollers 14 are in elastic relation with the sprocket 16 through the medium of the chain 15 and owing to the fact of the special joint of the secondary chassis beneath the principal chassis.

The rollers 14 run on the cheeks 17 of the lower side of the chain and also carry its upper side.

A tightening pulley 18, located toward the front of the vehicle and connected to the principal chassis by a stretcher, serves to maintain a suitable tightness for the chain 15.

To effect turns, it suffices to put the brake on one of the two sprocket wheels 16 which actuate each of the two chains. One can thus turn to the right or the left according to the side of the braked sprocket wheel.

The propelling chain is fitted with a set of plates 19 the special rounded form of which is intended to facilitate turning. These plates are preferably of stamped steel; they are connected to the chain proper by bolts which traverse them and form at the same time stays on which the chain rollers are strung.

20 is a speed gear case intended both to drive the chain sprocket 16 and the tools of a plowing apparatus which can be connected to either of the two chassis.

Having now described my invention what I claim as new and desire to secure by Letters Patent is:—

1. In a motor driven agricultural vehicle, a principal chassis carrying the motor and the various transmission and driving parts in combination with an auxiliary chassis, vertically sliding universal joint means between said two chassis which do not allow of relative longitudinal or lateral displacement, and flexible supports by which one chassis is carried by the other.

2. In a motor driven agricultural vehicle, a principal chassis carrying the motor and the various transmission and driving parts, the cross members being provided with vertical guides and sliding blocks, in combination with an auxiliary chassis, pivots on the cross member of same, vertical guides on the longitudinal members, sliding blocks in the said vertical guides, two subsidiary longitudinal members arranged parallel to and fixed below the longitudinal members of principal chassis, pivots on said members engaging the sliding blocks on the longitudinal members, and spiral springs arranged vertically between the two chassis.

3. In a motor driven agricultural vehicle, a principal chassis carrying the motor and the various transmission and driving parts in combination with an auxiliary chassis, vertically sliding universal joint means between said two chassis which do not allow of relative longitudinal or lateral displacement; flexible supports by which one chassis is carried by the other, pins arranged on each side of the auxiliary frame in parallel or horizontal lines, rollers on said pins and endless driving chains upon the lower side of which the said rollers run while the upper side is supported by the said rollers.

4. In a motor driven agricultural vehicle, a principal chassis carrying the motor and the various transmission and driving parts in combination with an auxiliary chassis, vertically sliding universal joint means between said two chassis which do not allow of relative longitudinal or lateral displacement; flexible supports by which one chassis is carried by the other, pins arranged on each side of the auxiliary frame in parallel or horizontal lines, rollers on said pins, endless driving chains upon the lower side of which the said rollers run while the upper side is supported by the said rollers, and a sprocket wheel carried by the principal chassis for driving the endless chains.

5. In a motor driven agricultural vehicle, a principal chassis carrying the motor and the various transmission and driving parts in combination with an auxiliary chassis, vertically sliding universal joint means between said two chassis which do not allow of relative longitudinal or lateral displacement; flexible supports by which one chassis is carried by the other, pins arranged on each side of the auxiliary frame in parallel or horizontal lines, rollers on said pins, endless driving chains upon the lower side of which the said rollers run while the upper side is supported by the said rollers, a sprocket wheel carried by the principal chassis for driving the endless chains, pulleys carried by the principal chassis and regulating devices connected therewith for the purpose of keeping the driving chains suitably tight.

In testimony whereof I have signed my name to this specification in the presence of two subscribing witnesses.

JULES GOBIET.

Witnesses:
A. K. SILBERMAN,
ELY E. PALMER.